United States Patent [19]
Keith

[11] Patent Number: 5,363,139
[45] Date of Patent: Nov. 8, 1994

[54] METHOD AND APPARATUS FOR SCALABLE COMPRESSION AND DECOMPRESSION OF A DIGITAL MOTION VIDEO SIGNAL

[75] Inventor: Michael Keith, Holland, Pa.

[73] Assignee: Intel Corporation, Santa Clara, Calif.

[21] Appl. No.: 995,122

[22] Filed: Dec. 22, 1992

Related U.S. Application Data

[63] Continuation-in-part of Ser. No. 861,227, Apr. 1, 1992, Pat. No. 5,325,126.

[51] Int. Cl.⁵ ............................................. H04N 7/137
[52] U.S. Cl. .................................... 348/415; 348/390; 348/409
[58] Field of Search ............... 358/133, 136, 135, 105; 340/703; 348/390, 409, 415, 416

[56] References Cited

U.S. PATENT DOCUMENTS

| | | | |
|---|---|---|---|
| 4,839,724 | 6/1989 | Keesen et al. ....................... | 358/135 |
| 4,857,993 | 8/1989 | Music et al. ........................ | 358/136 |
| 4,922,508 | 5/1990 | Moriya ............................... | 358/133 |
| 4,930,013 | 5/1990 | Leaning .............................. | 358/133 |
| 4,942,465 | 7/1990 | Ohta .................................. | 358/133 |
| 5,130,701 | 7/1992 | White et al. ....................... | 358/133 |
| 5,134,477 | 7/1992 | Knauer et al. ...................... | 358/136 |
| 5,136,663 | 8/1992 | Nishio ................................ | 358/133 |

Primary Examiner—Tommy P. Chin
Assistant Examiner—Bryan Tung
Attorney, Agent, or Firm—Carl L. Silverman; William H. Murray; Daniel H. Golub

[57] ABSTRACT

In a method and apparatus for scalably encoding in real time a sequence of digital video frames, a target digital processor class to be used for decoding the sequence is selected. A stillperiod value is selected in accordance with the selected target digital processor class. Every Nth frame of the sequence is then encoded as a still frame, and all other frames are encoded using interframe difference values, wherein N is equal to the stillperiod value.

2 Claims, 9 Drawing Sheets

METHOD AND APPARATUS FOR SCALABLE COMPRESSION AND DECOMPRESSION OF A DIGITAL MOTION VIDEO SIGNAL

CROSS REFERENCE TO RELATED APPLICATIONS

This application is a continuation-in-part of copending U.S. patent application Ser. No. 07/861,227, filed Apr. 1, 1992, now U.S. Pat. No. 5,325,126.

FIELD OF THE INVENTION

This invention relates to video signal processing generally and particularly to systems for providing a compressed digital video signal representative of a full color video signal.

BACKGROUND OF THE INVENTION

In real time video systems, compression and decompression are typically done using the same or similar hardware at roughly the same speed. Real time video systems have often required hardware that is too expensive for a single user, or such systems have sacrificed picture quality in favor of lower cost hardware. This problem has been bypassed by the use of presentation level video systems where the compression is performed on expensive hardware, but the decompression is done by low cost hardware. This solution works only in situations where the single-user system needs only to playback compressed video which has been prepared ahead of time.

It is an object of the present invention to provide a system for compressing and decompressing motion video in real time which may operate on lower cost hardware while maintaining acceptable picture quality.

Further objects and advantages of the invention will become apparent from the description of the invention which follows.

SUMMARY OF THE INVENTION

In a method and apparatus for scalably decoding a sequence of encoded digital video frames on a digital processor, a frame discard interval is determined in accordance with the processing power of the digital processor and a counter is initialized. A frame is selected from the sequence for decoding. The selected frame is decoded and the counter is incremented. If the counter is less than the discard interval then the process is repeated; otherwise, at least one subsequent frame from the sequence is replaced with a sync frame which is thereafter decoded.

A method and apparatus for scalably encoding in real time a sequence of digital video frames. A target digital processor class to be used for decoding the sequence is selected. A stillperiod value is selected in accordance with the selected target digital processor class. Every Nth frame of the sequence is then encoded as a still frame, and all other frames are encoded using interframe difference values, wherein N is equal to the stillperiod value.

DETAILED DESCRIPTION OF THE PREFERRED EMBODIMENT

Figure 1:
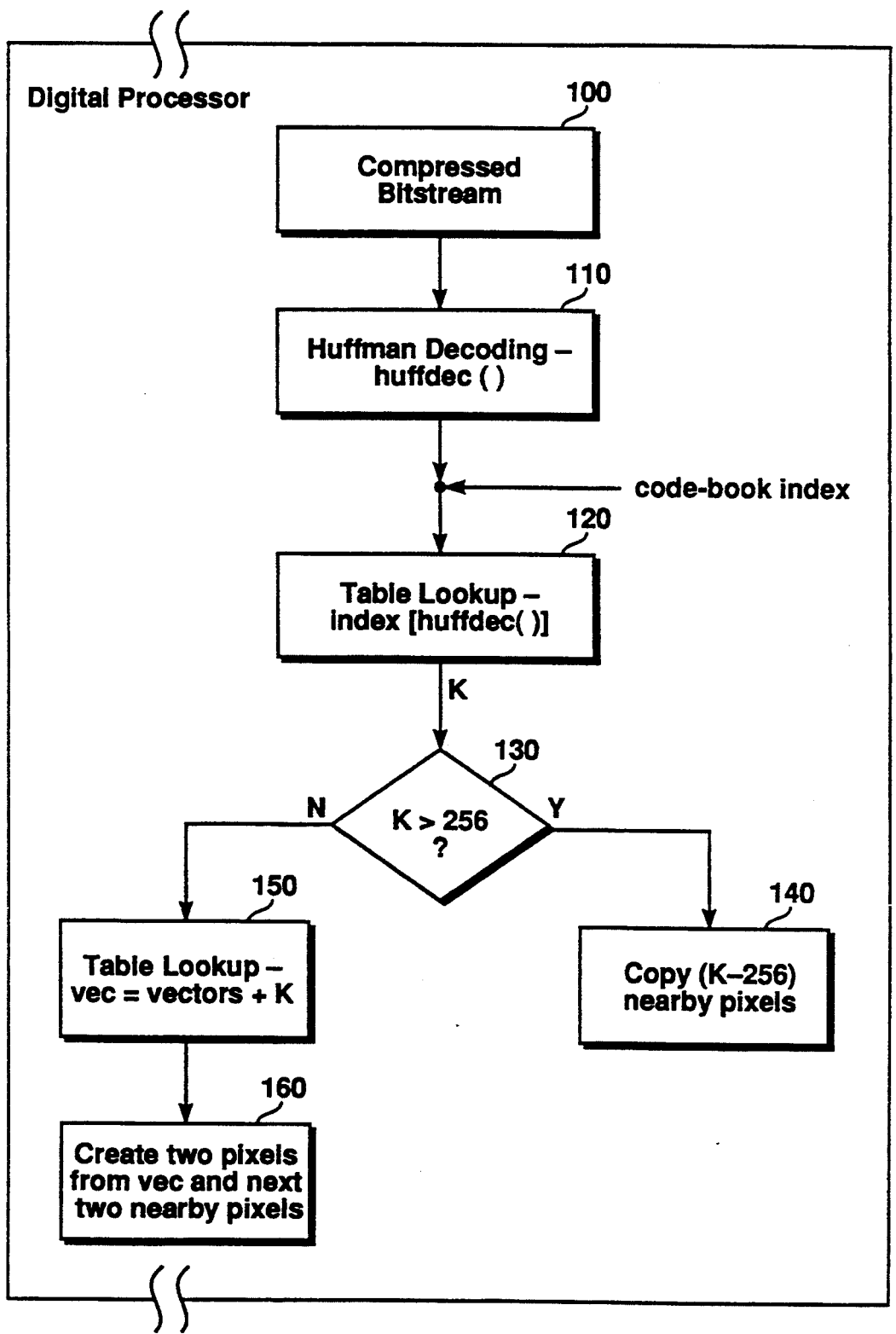
FIG. 1 is a flow diagram illustrating the operation of a decoder according to a preferred embodiment of the present invention.

Referring now to FIG. 1, there is shown a flow diagram illustrating the operation of a decoder for decoding a bitstream 100 according to a preferred embodiment of the present invention. Bitstream 100 represents a motion video sequence of one or more images which have been encoded in real time. Encoded data from bitstream 100 is applied to Huffman decoder 110 to derive a code-book index representing the position of a code-word within a lexicographically-ordered list of code-words. The code-book index is then used as an entry point to determine an index value from look-up table 120. Comparing means 130 are provided for comparing the index value to a predetermined threshold. If the index value is greater than the predetermined threshold, then copying means 140 determines at least one current pixel by copying a corresponding previous pixel into the location of a current pixel. In a preferred embodiment, copying means 140 calculates the amount that the index value exceeds the predetermined threshold, and then determines that number of current pixels by copying that number of corresponding previous pixels into respective current pixel locations. If the index value is not greater than the predetermined threshold, then the index value is used as an entry point to determine at least one vector value from vector table 150. Means 160 then determines at least one current pixel from a vector value and a corresponding previous pixel. In the preferred embodiment, means 160 uses the index value to determine two vector values which are adjacent in vector table 150. The two vector values are then used by means 160 to determine two adjacent current pixels from two corresponding previous pixels.

The preferred embodiment of the present invention is intended for compression of 8-bit planes of an image. The present invention may also be used with YUV images, and other image formats, including 12-bit image formats, may also be used. In the preferred embodiment, the same compression and decompression process steps are applied to each color component of each image in a sequence. As used below, the term image refers to a single color component of an image.

Figure 2A:
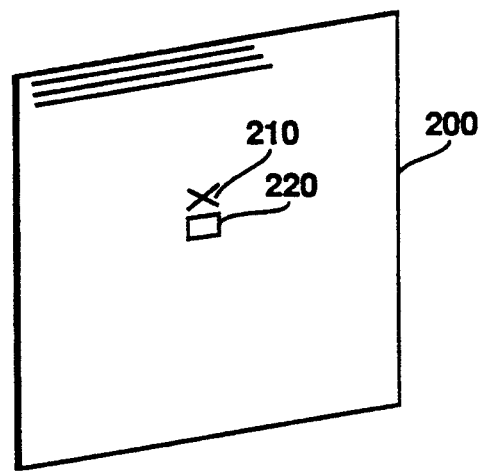
FIG. 2A shows the use of a corresponding previous pixel to perform intra-frame decoding in accordance with a preferred embodiment of the present invention.
Figure 2B:
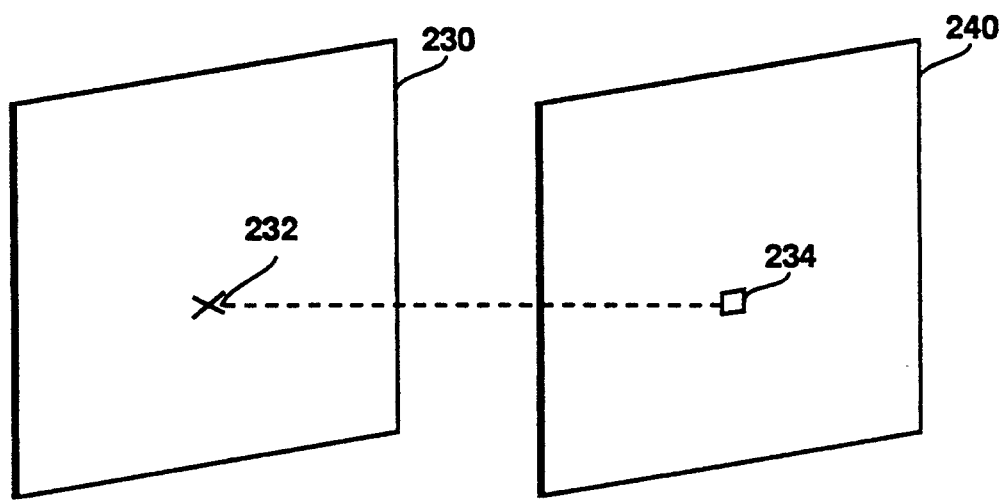
FIG. 2B shows the use of a corresponding previous pixel to perform inter-frame decoding in accordance with a preferred embodiment of the present invention.

In the preferred embodiment, each image in the sequence is encoded as either a still image or by using inter-frame differences. During the encoding of an image, each pixel in the image is subtracted from a corresponding previous pixel and the differences are encoded. As shown in FIG. 2A, if the image (200) is being encoded as a still (intra-frame encoding), the corresponding previous pixel (210) is preferably the pixel directly above the current pixel being encoded (220). As shown in FIG. 2B, if the image (240) is encoded using inter-frame differences, the corresponding previous pixel (232) is preferably the pixel in the previous image (230) located in the same position (in the bitmap) as the current pixel being encoded (234). In either case, there is a difference image (whose values tend to cluster around zero) which is encoded. Difference images are preferably encoded using 2-D vector quantization, with some run-length encoding added to help encode large areas of zeros efficiently.

In the preferred embodiment, bitstream 100 includes the following fields for each frame in a sequence: StillFlag, DataSize, ImageHeight, ImageWidth, Flags, VectorSet, a Huffman table descriptor for the image, and Huffman encoded data for the Y, V, U planes. The StillFlag field indicates whether the image is a still, DataSize indicates the size of the bitstream in bits, and ImageHeight and ImageWidth give the size of the decoded image in pixels. The Flags field indicates whether the data in the bitstream represents an image that has been encoded at full resolution, half vertical resolution, half horizontal resolution, or half vertical and half horizontal resolution. Such half resolution images may be obtained prior to encoding by subsampling the full resolution image in one or both dimensions. In the preferred embodiment, an image for encoding is considered to be at full resolution if it is ImageHeight pixels high and ImageWidth pixels wide; it is considered to be at half vertical resolution if it is ImageHeight pixels high and ImageWidth/2 pixels wide; it is considered to be at half horizontal resolution if it is ImageHeight/2 pixels high and ImageWidth pixels wide; and it is considered to be at half vertical and half horizontal resolution if it is ImageHeight/2 pixels high and ImageWidth/2 pixels wide.

In the preferred embodiment, the VectorSet field is a number from 0 to 7 which is used to select one of eight vector sets to use for decoding an image. Each of the vector sets contains 128 ordered pairs which may be thought of as points defined by X and Y coordinates. In all the vector sets, the ordered pairs are clustered about the point (128, 128); however, the average distance between the ordered pairs and the center point (128, 128) varies among the vectors sets. In VectorSet 0, the ordered pairs are closely clustered about (128, 128). VectorSet 0 thus corresponds to the lowest quantization level. As one moves from VectorSet 0 to VectorSet 7, the ordered pairs cluster less closely around (128, 128). VectorSet 7 thus corresponds to the highest quantization level.

The eight vector sets used in the preferred embodiment of the present invention are attached hereto as Appendix I. In the preferred embodiment, the vectors have arithmetic values in the range −128 to 127. The vector values shown in Appendix I have 128 added to them, so that they are in the range 0 to 255. Other vector sets may be used without departing from the spirit of the present invention.

In the preferred embodiment, the value of the VectorSet field may vary from image to image, thus allowing the encoder to vary the quantization level between images. In this embodiment, the vector set selected by the VectorSet field is used to decode the Y component image. The vector set selected by the value VectorSet/2 is used for the U, V components. Better quantization is normally required for encoding the U, V component images, since these components are typically subsampled spatially. In an alternate embodiment, a single vector set may be used to encode and decode all images in a sequence.

A Huffman table descriptor for each image is also included in the format of bitstream 100. The Huffman table is preferably of the form shown in Table I below:

TABLE I

| |
|---|
| 0[xx . . . x] |
| 10[xx . . . x] |
| 110[xx . . . x] |
| 1110[xx . . . x] |
| 11110[xx . . . x] |
| 111110[xx . . . x] |
| 1111110[xx . . . x] |
| 11111110[xx . . . x] |

Byte K in the Huffman table descriptor indicates how many "x bits" there are in row K of the above table. The Huffman decoding operation collects bits from the bitstream one at a time until a code-word in a code-book is recognized. Huffman decoder returns a code-book index representing the position of a code-word within a lexicographically-ordered list of code-words.

Following the above header information in bitstream 100 is the Huffman encoded data describing the Y plane. Data for the V and U planes immediately follows the Y plane data. In the preferred embodiment, the V and U data describe a bitmap which is ¼ the size horizontally and ¼ the size vertically of the Y bitmap. The final result is a YUV 4:1:1 image which may be displayed directly by a display processor, or converted to some other display format if desired.

Decoding Procedure

The decoding procedure for a still image can be described by the c-language pseudo code in Table II below. In the pseudo code, the function huffdec() performs a huffman decode operation as described above and returns an unsigned integer representing the code-book index:

TABLE II

Define
    Width = ImageWidth, divided by 2 depending on the
        value of Flags
    Height = ImageHeight, divided by 2 depending on
        the value of Flags
Then:
    unsigned char *curr,*prev;
    unsigned int *vec;
    for (x=0; x<Width; x++) // Fill first line with 128's
        bitmap[0] [x]= 128;
    for (y=0; y<Height; y++) // for each line of image
    {
// point to beginning of current line and previous line
        curr = &bitmap[y] [0];
        prev = &bitmap[y - (y != 0)] [0];
        for (x=0; x<Width; x+=2) // for each pair of

TABLE II-continued

```
                    pixels
    {
        k = index[huffdec() ];
// Now do either a run-length of O's or a single vector,
// depending on the value of k.
        if (k > 256) // run-length of O's?
        {
            for (i=0; i<k-256; i++)
                *curr++ = *prev++;
            x += k-258;
        }
        else // apply a single vector
        {
            vec = vectors + k;
            *curr++ = clamp (*prevv++ + *vecc++);
            *curr++ = clamp (*prevv++ + *vecc++);
        }
    }
}
where:
'vectors' is a pointer to the vector set to use for
this image, and index[] is the following array:
index[] = {
    2,   4,  258,   6,   8, 260,  10,  12,
  262, 264,  14,  16, 266,  18,  20,  22,
   24,  26,  28, 268,  30,  32, 270, 272,
   34,  36,  38,  40, 274,  42,  44, 276,
   46,  48, 278,  50,  52, 280,  54,  56,
  282,  58,  60, 284,  62,  64, 286,  66,
   68, 288,  70,  72,  74,  76,  78,  80,
   82,  84,  86,  88,  90,  92,  94,  96,
   98, 100, 102, 104, 106, 108, 110, 112,
  114, 116, 118, 120, 122, 124, 126, 128,
  130, 132, 134, 136, 138, 140, 142, 144,
  146, 148, 150, 152, 154, 156, 158, 160,
  162, 164, 166, 168, 170, 172, 174, 176,
  178, 180, 182, 184, 186, 188, 190, 192,
  194, 196, 198, 200, 202, 204, 206, 208,
  210, 212, 214, 216, 218, 220, 222, 224,
  226, 228, 230, 232, 234, 236, 238, 240,
  242, 244, 246, 248, 250, 252, 254,
}
and clamp(x) is a function defined as follows:
clamp(x) = 0 if x<128
           x-128 if 128 >= x < 384
           255 if x >= 384
```

After executing the above procedure, the decoder then scales the image up horizontally and/or vertically by a factor of two, if requested to by the Flags field in the header.

The decoding procedure for an inter-frame (non-still) image is similar to that described in Table II, and is obtained by deleting the first 2 lines of code, and changing the line prev=&bitmap[y−(y!=0)][0];

to prev=&prev_bitmap[y][0];

Encoding Procedure

Figure 3:
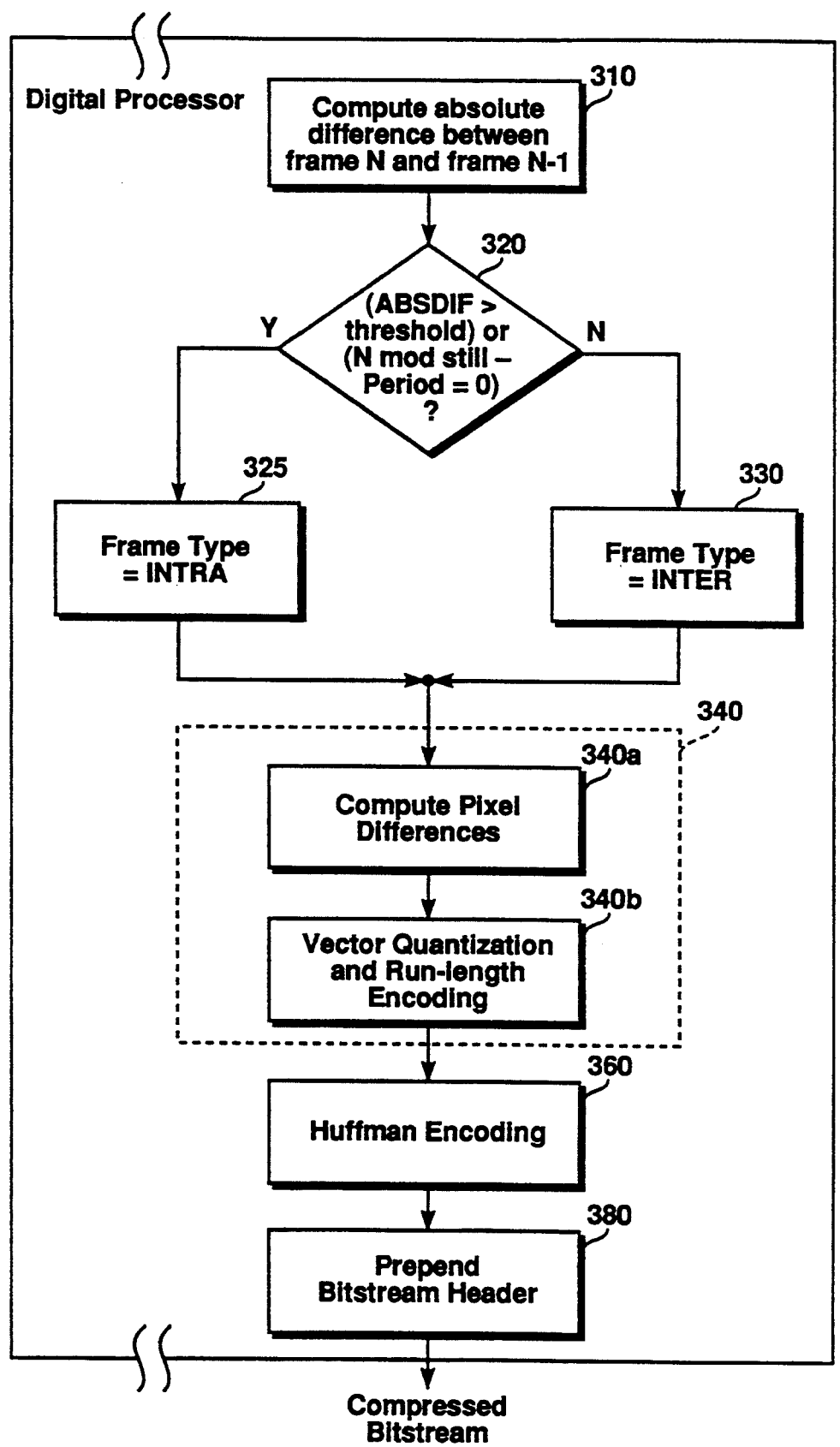
FIG. 3 is a flow diagram illustrating the operation of an encoder according to a preferred embodiment of the present invention.

Referring now to FIG. 3, there is shown an overall flow diagram for encoding an image in real time according to a preferred embodiment of the present invention.

The first step is to determine whether to encode the image as an intra-frame (a still image) or an inter-frame (an image encoded relative to the previous image in the sequence). For this purpose, a user parameter called StillPeriod is used. The user sets StillPeriod to a given value (K) to force every Kth image to be encoded as a still (INTRA) image. For efficiency of encoding, an encoder may choose to use an INTRA frame even for images in between every-Kth image. For example, if there is a scene cut or if the video enters a period of very high motion, then an intra-frame image will be more efficient to encode than an inter-frame, because the correlation between adjacent images will be too small to be advantageous.

As shown in FIG. 3, means 310 first computes the absolute difference (ABSDIF) between frame N and the previous frame (N-1). This involves summing the absolute value of the differences between all pixels in the two images. For efficiency of computation it is preferable to only use a subset of the pixels in the two images for the purpose of comparison. This provides as nearly an accurate measure of the difference between the two images at a greatly reduced computational cost. After this computation, means 320 (i) compares the absolute difference between frame N and a previous frame N-1 with a predetermined threshold, and (ii) computes the value of N mod StillPeriod. If means 320 determines (i) that the absolute difference is greater than the predetermined threshold or (ii) that (N mod StillPeriod) is zero, then the frame type is set to INTRA by means 325. Otherwise, the frame type is set to INTER by means 330. In alternate embodiments, parameters other than the absolute difference between all pixels in frames N and N-1 may be used in determining how to set the frame type. For example, the mean-square error between pixels in frames N and N-1 or the relative difference between such pixels may be used.

Figure 3A:
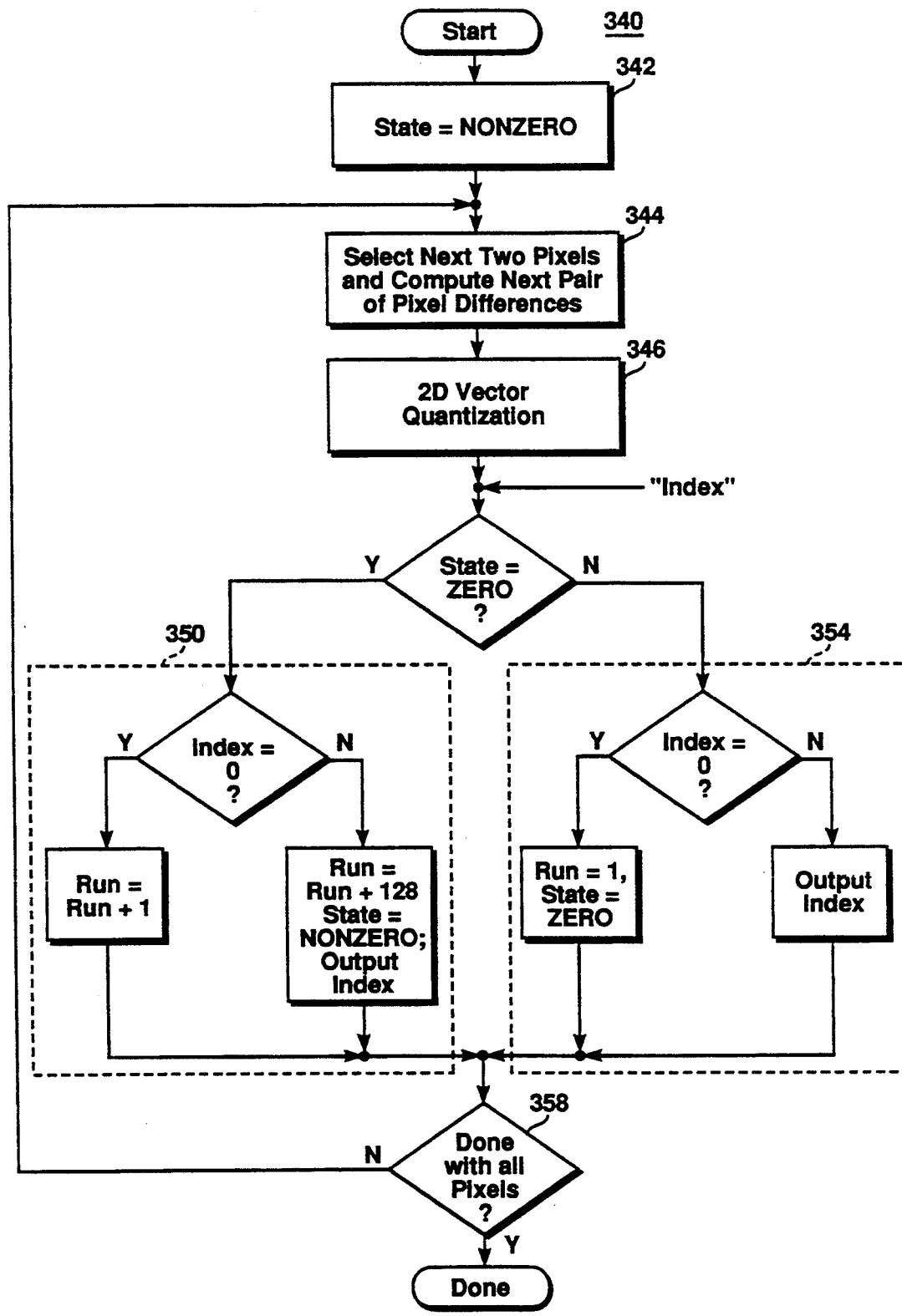
FIG. 3A is a flow diagram illustrating the vector quantization and run-length encoding procedures of the encoder of FIG. 3.
Figure 3B:
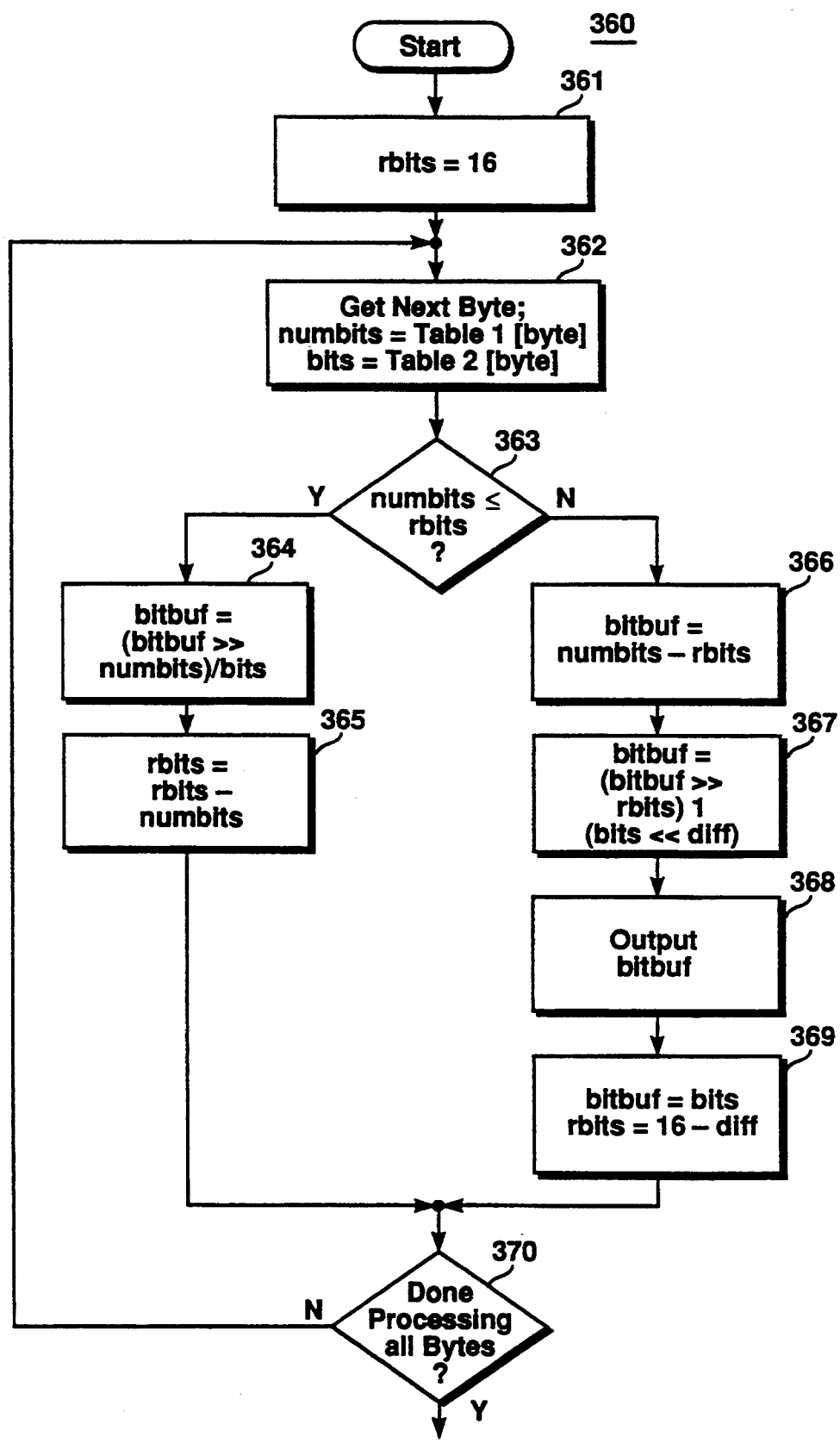
FIG. 3B is a flow diagram illustrating the Huffman encoder of FIG. 3.

After determining whether to encode as an INTRA or INTER image, means 340a next computes the pixel differences which are to be encoded. As described in the discussions of FIGS. 2A, 2B above, if the image is an INTRA, each pixel has subtracted from it the value of the pixel immediately above it in the same image. (For the top row, a "phantom value" of 128 is used for these pixels.) If the image is an INTER image, each pixel has subtracted from it the value of the pixel in the same spatial location in the previous image. The pixel differences are then vector-quantized and run-length encoded by means 340b. Further details of this vector-quantization and run-length encoding procedure are shown in FIG. 3A and will be described below. The output of means 340b is a string of bytes with values corresponding to the values in the index[] array (divided by 2). This string of bytes is Huffman encoded by means 360 into variable-length codes. Further details of Huffman encoder 360 are shown in FIG. 3B and will be described below. In the final encoding step, means 380 prepends the proper bitstream header.

Referring now to FIG. 3A, there is shown a flow diagram illustrating the operation of means 340 of FIG. 3. In particular, FIG. 3A shows the run-length encoding and vector quantization procedures of means 340b. The operation of means 340 is performed with a 2-state machine. The two states are denoted as ZERO and NONZERO. The ZERO state indicates that the system is in the middle of processing a run of 0 values. The NONZERO state indicates that non-zero values are being processed. The purpose of the two states is to allow for efficient encoding of consecutive zero differences.

In the first step of FIG. 3A, means 342 initializes the state machine to the NONZERO state. Next, means 344 computes the next pair of pixel differences. In the preferred embodiment, the image is processed in normal raster-scan order, from top to bottom and left to right within each line. The "next pair" of pixels means the next two pixels on the current scan line being processed. As stated above, the differences are taken with the pixels immediately above these pixels (if this image is being encoded as an INTRA) or with the pixels in the same spatial location in the previous image (if this image is being encoded as an INTER image). Since these two values represent pixel differences, they will typically be small, or close to zero.

In the next step, means 346 operates to 2-D vector-quantize the two pixel difference values into a single number (index) between 0 and 127. The possible index values correspond to 128 points in 2-D space known as a "vector set". Geometrically, a vector set represents 128 points in the 2-D square bounded by the values −255 and 255 which have been chosen as reasonable approximations to every point in the square. Thus, if the two pixel difference values are denoted by d1 and d2, they can be represented as a point in the 2-D square with coordinates (d1, d2). The vector quantization operation attempts to choose the closest (in Euclidean distance) of the 128 representative points to be used to encode the point (d1, d2). Since the vector set is relatively small, this choosing operation can be done quickly using a lookup table. According to this procedure, the values d1 and d2 are first limited to the range −127 to +127. Then, the quantity 128 is added to produce values in the range 0 to 255. Next, a value p is calculated according to equation (1) below, wherein "|" represents a bitwise inclusive OR operation, and "<<" and ">>" indicate left and right shift operations, respectively, of the left operand by the number of bit positions given by the right operand:

$$p=(d1>>2)|(d2>>2<<6) \quad (1)$$

The value of p is in the range 0 to 4095. The value at position 'p' in a 4096-entry lookup table is then used to get the index corresponding to the closest representative point in the vector set corresponding to (d1, d2). Although a slight inaccuracy in the computation is introduced by not using the lower 2 bits of d1 and d2, without this step the lookup table would be 64K instead of 4K. A separate lookup table is required for each of the eight vector sets for a total size of 32K bytes. During encoding, the degree of quantization used (e.g., the VectorSet value chosen) is varied by known feedback processes which monitor the size of encoded images in the bitstream.

The remainder of FIG. 3A maintains the value of a variable 'run' which indicates how many consecutive index values of 0 have been produced. When a run of 0 values is ended, means 350 outputs the value 128+run. For each non-zero index, means 354 outputs the index value itself. Means 358 functions to repeat the process (starting from means 344) until all pixels have been processed. The encoding procedure shown in FIGS. 3, 3A for a still (INTRA) image can be described by the c-language pseudo code in Table III below:

TABLE III

```
Define
    Width = ImageWidth, divided by 2 depending on the
        value of Flags
    Height = ImageHeight, divided by 2 depending on the
        value of Flags
Then
    unsigned char *curr, *prev,grey[XMAX];
    unsigned char *lookup
    for (x=0; x<Width; x++) // make a line of 128's
        grey[x] = 128;
    state = NONZERO;
```

TABLE III-continued

```
for (y=0; y<Height; y++) // for each line of image
{
    curr = &bitmap[y] [0];
    if (y > 0)
        prev = &bitmap[y-1] [0];
    else
        prev = &grey[0];
    for (x=0; x<Width; x+=2)
    {
        d1 = clamp(*curr++ - *prev++ + 128);
        d2 = clamp(*curr++ - *prev++ + 128);
        index = lookup[ (d1 >> 2) | (d2 >> 2 <<
            6) ];
        if (state == ZERO)
        {
            if (index == 0)
                run++;
            else
                { huffenc(run + 128); huffenc(index);
                    state = NONZERO; }
        }
        else if (state == NONZERO)
        {
            if (index == 0)
                { run = 1; state = ZERO; }
            else
                huffenc(index);
        }
    }
}
where
'lookup' is a pointer to the 4K difference-pair-to-
vector-index lookup table for the current vector set;
huffenc(x) is a function to output the appropriate
Huffman codeword such that index[huffdec(huffenc(x))]
= x.
```

The encoding procedure for an inter-frame image is similar to that described in Table III, and is obtained by deleting the first 2 lines of code, and changing the lines

```
if (y > 0)
    prev = &bitmap[y-1] [0];
else
    prev = &grey[0];
to
    prev = &prev_bitmap[y] [0];
```

Referring now to FIG. 3B, there is shown a flow diagram illustrating the Huffman encoding of the byte values output by means 340b. The Huffman encoding step replaces the fixed 8-bit codes with a statistically-optimized set of variablelength codes. Before the Huffman encoding begins, two tables (table1 and table2) are precalculated to specify, for each 8-bit value to be Huffman encoded, the number of bits in the Huffman code and the actual bits themselves. The bits are top-justified in a 16-bit value. The Huffman encoding operation is assisted by a 16-bit register called 'bitbuf' in which bits are collected. Another register, 'rbits' is used to indicate how many unused bits there are remaining in 'bitbuf'. Means 361 initially sets rbits to 16, since 'bitbuf' is initially empty.

Means 362 reads the next byte of data and looks up 'numbits' and 'bits' in the two tables. Decision block 363 determines whether there is room enough in 'bitbuf' to hold the entire Huffman code word, i.e., is numbits <=rbits? If so, then 'bits' is ORed into 'bitbuf' by means 364, and 'rbits' is reduced by the value of 'numbits' by means 365. If it is determined by decision block 363 that the bits do not fit in 'bitbuf' then the encoder puts as many bits as will fit into 'bitbuf', outputs 'bitbuf' puts the remaining bits into bitbuf, and sets rbits=16−−diff. More particularly, means 366 determines a value diff by subtracting rbits from numbits. Means 367 puts as many bits as will fit into bitbuf by ORing (bitbuf>>rbits) with (bits<<diff). Means 368 then outputs bitbuf and means 369 sets bitbuf to bits and rbits to 16 minus diff.

Decision block 370 determines whether the processing of all bytes is completed. If it is determined that all bytes have not been processed, the above process (starting with means 362) is repeated.

SYSTEM DETAILS

Figure 4A:
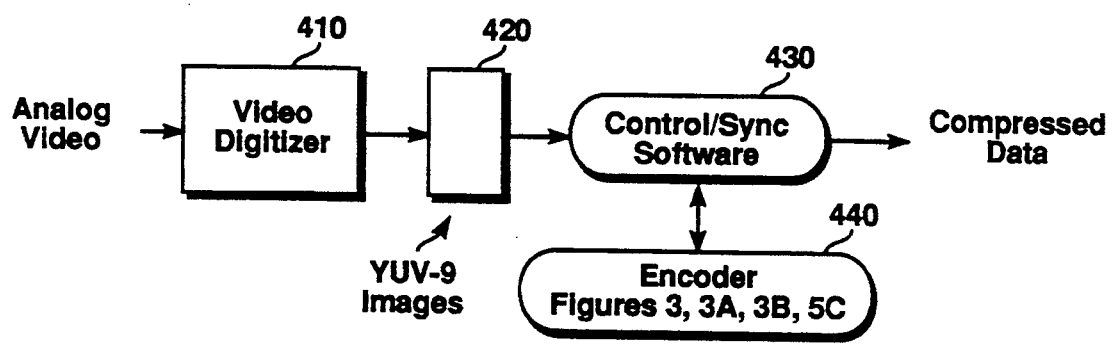
FIG. 4A is a flow diagram illustrating a video compression system according to the present invention.
Figure 4B:
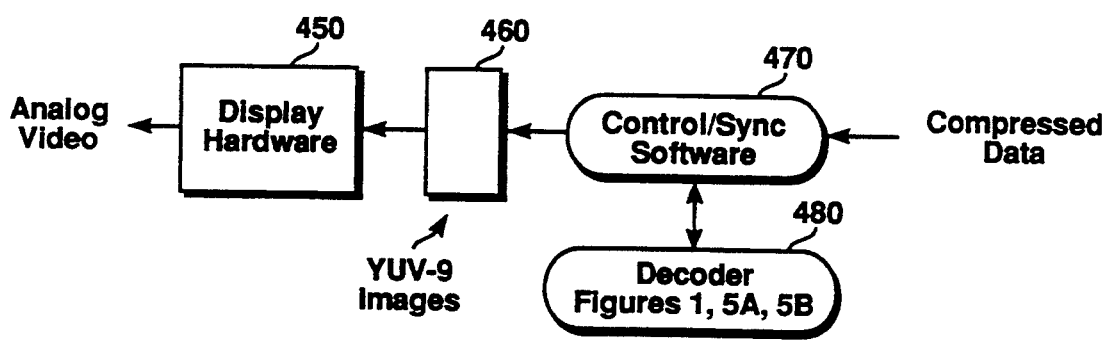
FIG. 4B is a flow diagram illustrating a video decompression system according to the present invention.

Two overall system block diagrams are shown in FIGS. 4A, 4B. FIG. 4A shows a block diagram for recording and FIG. 4B shows a block diagram for playback; however, the same system can be used (even simultaneously) for either recording (encoding) or playback (decoding).

Referring now to FIG. 4A, the analog video is first digitized by video digitizer 410, and the digital images are stored in memory 420 in "YUV-9" format. This format consists of three planes of 8-bit pixels: one Y plane, one U plane, and one V plane. The U and V planes are stored at ¼ the resolution in each dimension compared to the Y plane. Means 430 includes a set of control and synchronization routines which examine the images and invoke encoder 440 in order to compress successive frames of the digitized video. The bitstreams are then output to memory, from which they can be stored to hard disk or sent over a network.

Referring now to FIG. 4B, a playback system according to the present invention is shown. The playback diagram of FIG. 4B is the inverse of the record diagram shown in 4A. Thus, means 470 accepts as input compressed data and invokes decoder 480 as appropriate to decompress successive frames of the video. The decompressed video is stored in memory 460 in YUV-9 format. Display hardware 450 produces analog video from the YUV-9 data.

In the preferred embodiment, digitizer 410 can be programmed to digitize horizontally or vertically at any resolution. In effect, this means that the digitizer can be used to do part of the compression process. By programming the digitizer to a lower resolution, there will be less data for the encoder to compress and the final data size will be smaller.

In addition, digitizer 410 may dynamically alter the digitizer resolution (either horizontally or vertically) when the video becomes "hard" to compress. A method and apparatus for dynamically altering resolution based on image complexity is implemented in U.S. patent application entitled, "Method and Apparatus For Encoding Selected Images At Lower Resolution" by A. Alattar, S. Golin and M. Keith, filed Mar. 25, 1992, assigned Ser. No. 07/856,515, which application is assigned to the assignee of the present application and the contents of which are hereby incorporated herein by reference.

In the real time video system described above, the encoder takes incoming digitized images, compresses them, and outputs the compressed bitstream to a buffer in memory for extraction by the application. The simplistic view of the system assumes that everything works "ideally", so that a new compressed frame is generated exactly F times per second, where F is the desired frame rate requested by the user. However, there are at least two conditions which typically occur to make the operation of the system less than ideal:

(1) The analog video source may disappear for a period, thus precluding new digitized images from being obtained by the digitizer; and (2) The application may not extract compressed frames from the buffer fast enough, which means that the encoding system gets "stalled" by the inability to output more compressed frames (caused by the output buffer being full).

In either case, if the encoder simply fails to output frames, this will result in a loss of time synchronization. For example, if the system is encoding at 30 frames per second, the playback system would expect to get 900 frames in 30 seconds. If, due to conditions (1) or (2), less than 900 frames are generated (for example, 840), then upon playback the playback system will play these 840 frames at 30 frames per second, and the playback of these frames will occupy only 28 seconds. This is not acceptable, since the video information upon playback will not occupy the same amount of real time that it did during recording. This will be evident to the viewer by, for example, loss of audio/video synchronization.

A solution to this problem is presented by what will be termed "sync frames". During encoding, means 430 keeps track of real time using a clock signal. It attempts to generate F compressed data frames per second, as requested by the user, and it monitors how well it is doing. If at any point it determines that it is behind (i.e., fewer frames have been generated so far than there should be), it inserts a "sync frame" into the compressed buffer. A "sync frame" is a compressed data frame that appears in the bitstream just like a normal compressed frame (and so travels through the record and playback systems without any special handling) but which can be detected by the playback process as special.

The sync frame consists of the bitstream header (described above) with the DataSize field set to 128 and the other fields set to the appropriate values. A sync frame in effect counts the passage of time without causing a new image to appear on the screen. When the decoder encounters a sync frame, it simply copies the previous image to the current image bitmap. This results in no change to the display but the proper passage of time, so that accurate time synchronization results. Thus, if a system bottleneck occurs so that only 840 "real" compressed frames are created during a 30-second period, then means 430 will insert 60 sync frames. Thus, over the 30-second period there will be exactly 900 frames, as desired, but 60 of them will be sync frames. On playback, there will be some visual anomalies when the sync frames are processed, but exact time synchronization will be maintained.

The present invention may be implemented in real time (both compression and decompression) using an Intel model i750PB processor. Other processors, including Intel 386/486 processors, may be used to scalably decode video data which has been encoded accorded to the present invention.

Scalability

By manipulating the Flags and StillPeriod parameters in the encoder, it is possible to create real time video files which can be scalably decoded; that is, yielding reasonable-quality playback on a typical micro-processor (for example, a 386/486 class processor), and better quality on a higher-performance video signal processor chip (for example, a DVI i750 chip). In a preferred embodiment, real time video files which can be scalably decoded are created by setting Flags so that half vertical and half horizontal resolution is selected. The decoder would therefore normally be expected to scale up the image by 2× both vertically and horizontally after decoding. According to the present invention, if a sequence of 256×240 images is compressed at 128×120 resolution, it can be decompressed and displayed as a sequence of 128×120 images on a typical micro-processor. By opting not to interpolate the 128×120 images back up to 256×240 images, a typical micro-processor can be used to reproduce image sequences encoded in real time with a reasonable degree of quality. The image quality level can be improved through the use of a higher-performance video signal processor which reproduces the sequence by decoding and then interpolating back up to 256×240 images. Thus, the same encoded sequence can be reproduced at different quality levels depending on the limitations of the decompression hardware. Another aspect of real time video files which can be scalably decoded would allow a typical micro-processor system to use a VGA for display whereas a video signal processor system may use a 24-bit-color i750DB display. The micro-processor system might choose to display in monochrome to avoid messy YUV-to-VGA-clut conversion.

Figure 5A:
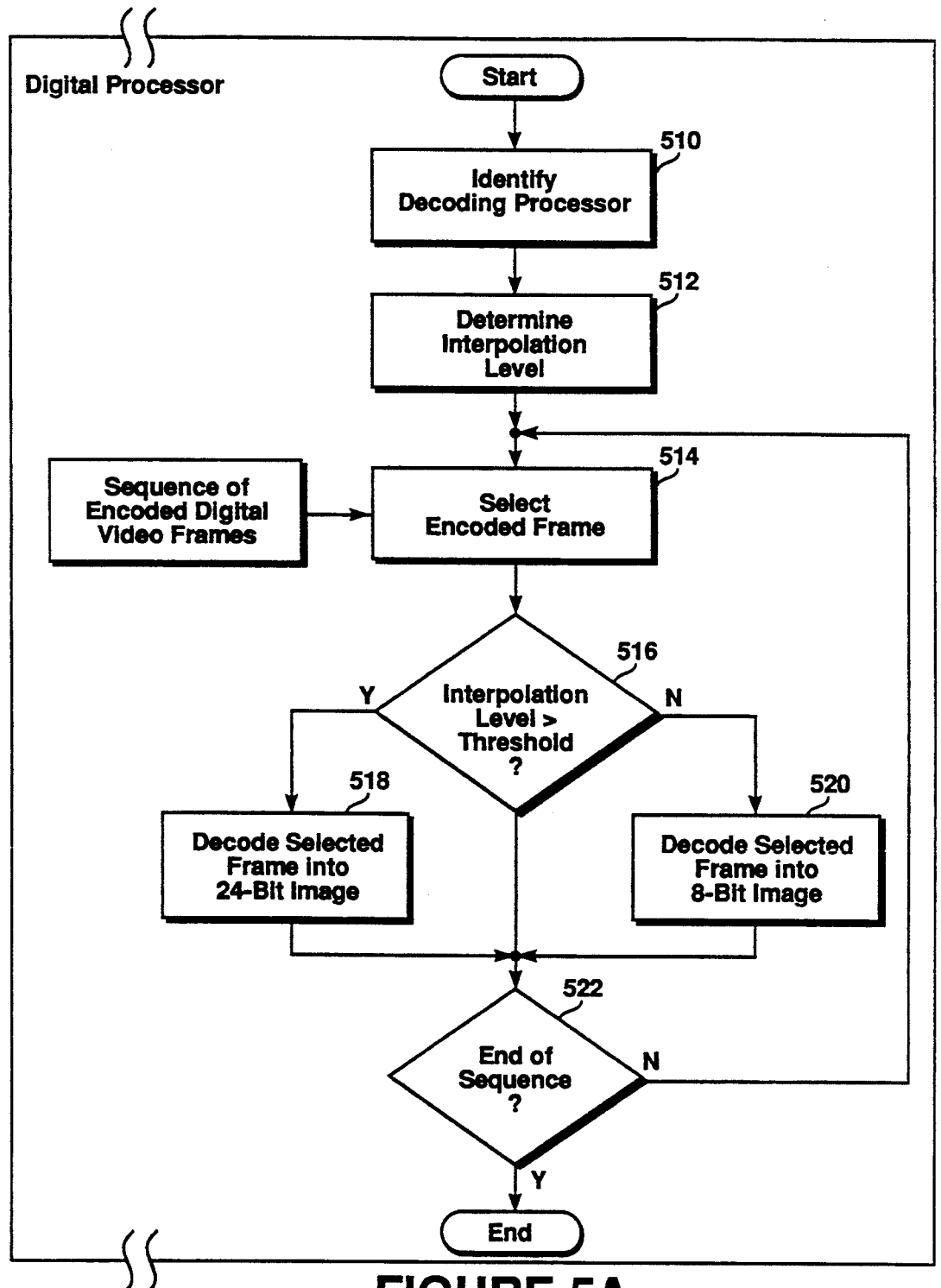
FIG. 5A is a flow diagram showing the operation of a preferred system for scalably decoding a digital video sequence in accordance with the present invention.

Referring now to FIG. 5A, there is shown a flow diagram illustrating the operation of a preferred system for scalably decoding a digital video sequence in accordance with the present invention. Means 510 are provided for identifying the processor to be used for decoding a sequence of encoded digital video images. Since a variety of different processors having different levels of processing capabilities may be used to decode the encoded sequence, means 510 will return a value representative of the processing power of the processor to be used for decoding. In a preferred embodiment, the value returned by means 510 will indicate whether the decoding processor is (i) a 386 class processor, (ii) a 486 class processor, or (iii) an i750PB processor. In alternative embodiments, means 510 may return values representative of the processor power of other processors and other processor classes. Means 512 is provided for determining a pixel depth interpolation level in accordance with the processing power identified by means 510. The pixel depth interpolation level determined by means 512 represents the pixel depth (in bits) of the decoded images to be produced by the scalable decoder. Means 514 are provided for selecting an encoded frame from a sequence of encoded digital frames. Means 516 is provided for comparing the pixel depth interpolation level with at least one threshold. If the pixel depth interpolation level is greater than a predetermined threshold, then means 518 forms a scalably decoded frame by interpolating the selected frame in accordance with a first pixel depth level. If the pixel depth interpolation level is not greater than the predetermined threshold, then means 520 forms a scalably decoded frame by interpolating the selected frame in accordance with a second pixel depth level, wherein the second pixel depth level has fewer bits than the first pixel depth level. In the preferred embodiment, the first pixel depth level is 24 bits and means 518 forms decoded frames having 24-bit pixels, while the second pixel depth level is 8 bits and means 520 forms decoded frames having 8-bit pixels. In alternative embodiments, decoded images of different pixel depths may be formed by means 518, 520. In still further embodiments, means 516 may compare the pixel depth interpolation level returned by means 512 with more than one threshold and chose between producing decoded images having more than two possible pixel depth levels. Means 522 is provided for determining whether each frame in the sequence of encoded frames has been decoded. If the end of the sequence has not been reached, the process is repeated from means 514.

Figure 5B:
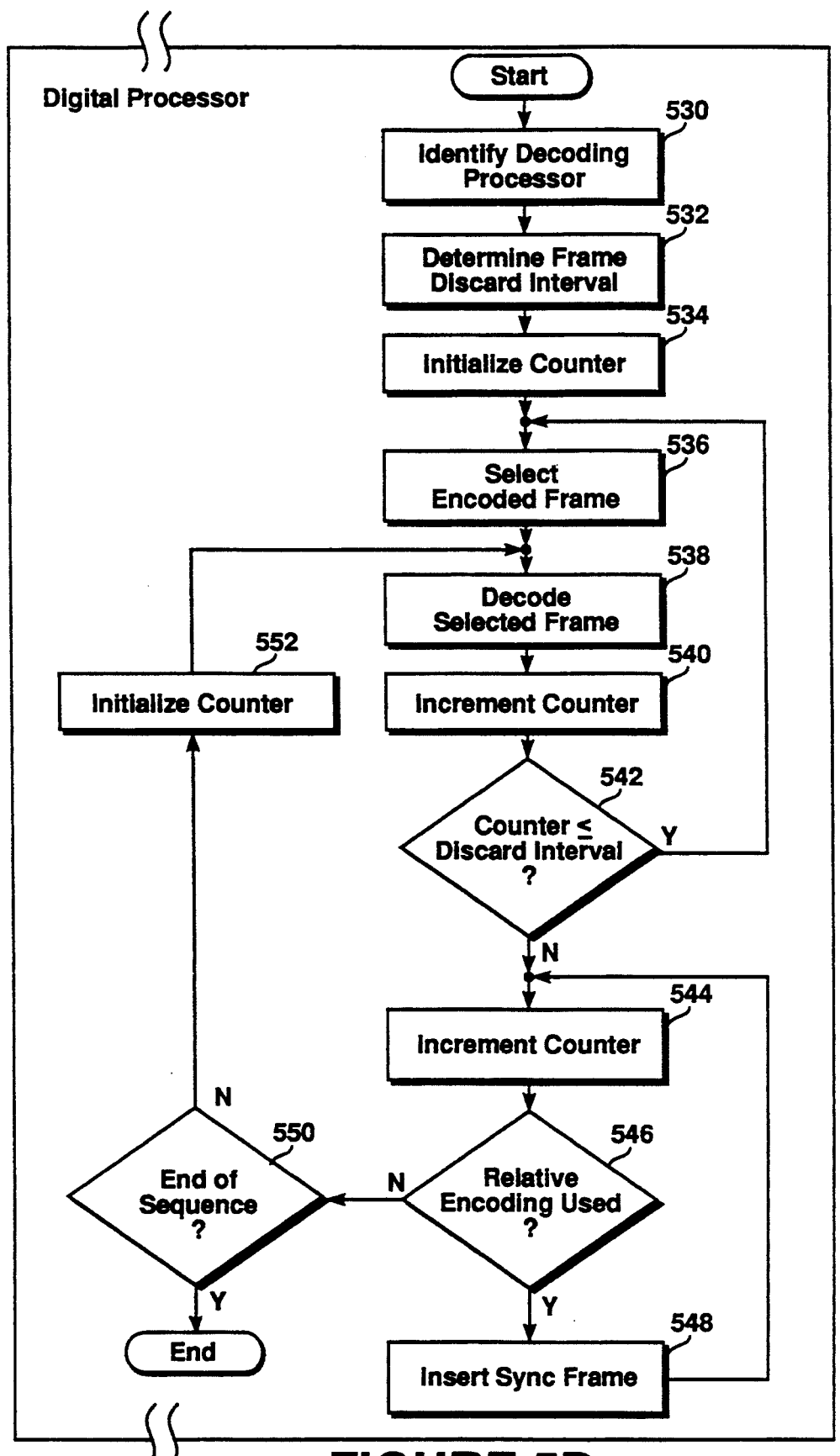
FIG. 5B is a flow diagram showing the operation of an alternative preferred system for scalably decoding a digital video sequence in accordance with the present invention.

In accordance with another aspect of scalable decoding shown in FIG. 5B, the present invention may be used to periodically replace one or more frames in an encoded sequence of frames with a corresponding number of sync frames. In this embodiment, sync frames are used to replace encoded frames that have been encoded using relative encoding and which will not be needed to decode subsequent frames in the sequence. For example, in a sequence of frames that have been encoded such that every tenth frame is encoded as a still frame, with the remaining frames being encoded using relative encoding, one or more frames immediately preceding each still frame may be replaced with a sync frame. The number of sync frames used will vary depending on the processing power of the processor being used for decoding.

Referring now to FIG. 5B, there is shown a flow diagram illustrating the system for scalable decoding described in the paragraph immediately above. Means 530 is provided for identifying the processor to be used for decoding a sequence of encoded digital video images. Means 530 functions substantially in accordance with means 510 described above. Means 532 is provided for determining a frame discard interval value in accordance with the processing power identified by means 530. The frame discard interval value is used to identify positions in the encoded sequence where frames that have been encoded using relative encoding will be "discarded" and replaced with sync frames. Means 534 is provided for initializing a counter, means 536 is provided for selecting an encoded frame from a sequence of encoded digital frames, means 538 is provided for decoding the encoded frame selected by means 536, and means 540 is provided for incrementing the counter. Means 542 compares the counter to the frame discard interval value. If the counter is larger than the frame discard interval value, then means 544 selects a subsequent frame from the sequence of encoded frames and means 546 determines whether the subsequent frame was encoded using relative encoding. If relative encoding was used to encode the selected subsequent frame, then the selected subsequent frame is "discarded" by means 548 and replaced with a sync frame which is then decoded. In the preferred embodiment, the present invention continues replacing subsequent selected frames with sync frames until it reaches a frame that was not encoded using relative encoding. Means 550 is provided for determining whether the end of the sequence has been reached. If the end of the sequence has not been reached, means 552 initializes the counter and the process is repeated from means 538.

Figure 5C:
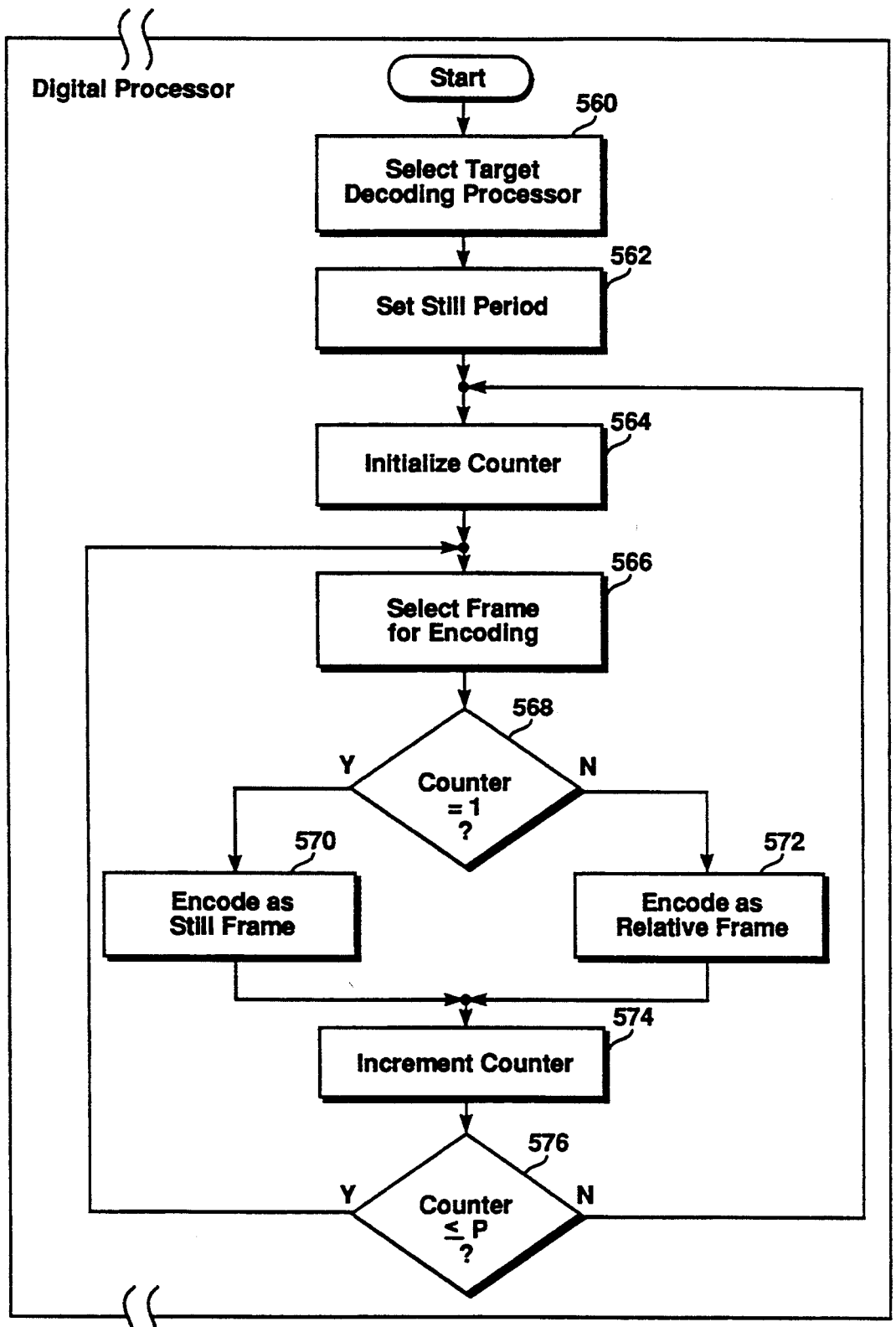
FIG. 5C is a flow diagram showing the operation of a preferred system for scalably encoding a digital video sequence in accordance with the present invention.

In a still further aspect of scalability illustrated in FIG. 5C, during real time compression a user may set the parameter "StillPeriod" to P, thus requiring every Pth image to be encoded as a still. P may also be set automatically by the encoding system, based on the processing power of the expected decoding hardware (the target decoder). The other images may then be encoded using inter-frame differences (relative encoding). P can typically be set quite small without adversely affecting image quality. By compressing a sequence with P=3, the processing requirements for a micro-processor type system can be reduced without adversely affecting image quality. For example, decompressing and displaying still images using a 386/486 processor typically yields a 10 fps display. This frame rate can be increased smoothly from 10 fps to 30 fps if P=3.

Referring now to FIG. 5C, there is shown a flow diagram illustrating the system for scalable real time encoding described in the paragraph immediately above. Means 560 is provided for selecting a target processor class to be used for decoding a scalably encoded sequence of digital video frames. Since a variety of different processors having different levels of processing capabilities may be used to decode the encoded sequence, means 560 will return a value representative of the processing power of the processor that the system (or its user) anticipates will be used for decoding. In a preferred embodiment, the value returned by means 560 will indicate whether the target decoding processor is (i) a 386 class processor, (ii) a 486 class processor or (iii) an i750PB processor. In alternative embodiments, means 560 may return values representative of other processors or other processor classes. Means 562 is provided for setting the StillPeriod value P in accordance with the value returned by means 560. Means 564 is provided for initializing a counter and means 566 is provided for selecting a frame for encoding. Means 568 compares the counter to a predetermined constant. If the counter is equal to the constant, means 570 encodes the selected frame as a still frame. otherwise, means 572 encodes the selected frame using relative encoding. Means 574 then increments the counter and means 576 compares the counter to P. If the counter is less than or equal to P, the process is repeated from means 566, otherwise, the process is repeated from means 564.

The present invention may be embodied in other specific forms without departing from the spirit or essential attributes of the invention. Accordingly, reference should be made to the appended claims, rather than the foregoing specification, as indicating the scope of the invention.

APPENDIX

Vector set 0

| | | | | | | | |
|---|---|---|---|---|---|---|---|
| 128 | 128 | 132 | 132 | 124 | 124 | 127 | 133 |
| 129 | 123 | 133 | 127 | 123 | 129 | 140 | 140 |
| 116 | 116 | 131 | 141 | 125 | 115 | 141 | 131 |
| 115 | 125 | 119 | 137 | 137 | 119 | 137 | 119 |
| 119 | 137 | 140 | 149 | 116 | 107 | 149 | 140 |
| 107 | 116 | 124 | 144 | 132 | 112 | 144 | 124 |
| 112 | 132 | 150 | 150 | 106 | 106 | 130 | 152 |
| 126 | 104 | 152 | 130 | 104 | 126 | 151 | 162 |
| 105 | 94 | 162 | 151 | 94 | 105 | 162 | 162 |
| 94 | 94 | 139 | 163 | 117 | 93 | 163 | 139 |
| 93 | 117 | 113 | 149 | 143 | 107 | 149 | 113 |
| 107 | 143 | 120 | 157 | 136 | 99 | 157 | 120 |
| 99 | 136 | 127 | 167 | 129 | 89 | 167 | 127 |
| 89 | 129 | 164 | 177 | 92 | 79 | 177 | 164 |
| 79 | 92 | 150 | 177 | 106 | 79 | 177 | 150 |
| 79 | 106 | 178 | 178 | 78 | 78 | 101 | 155 |
| 155 | 101 | 155 | 101 | 101 | 155 | 137 | 180 |
| 119 | 76 | 180 | 137 | 76 | 119 | 106 | 163 |
| 150 | 93 | 163 | 106 | 93 | 150 | 115 | 172 |
| 141 | 84 | 172 | 115 | 84 | 141 | 180 | 195 |
| 76 | 61 | 195 | 180 | 61 | 76 | 164 | 195 |
| 92 | 61 | 195 | 164 | 61 | 92 | 196 | 196 |
| 60 | 60 | 150 | 198 | 106 | 58 | 198 | 150 |
| 58 | 106 | 124 | 186 | 132 | 70 | 186 | 124 |
| 70 | 132 | 91 | 171 | 165 | 85 | 171 | 91 |
| 85 | 165 | 99 | 180 | 157 | 76 | 180 | 99 |

-continued
APPENDIX

| | | | | | | | |
|---|---|---|---|---|---|---|---|
| 76 | 157 | 134 | 202 | 122 | 54 | 202 | 134 |
| 54 | 122 | 182 | 215 | 74 | 41 | 215 | 182 |
| 41 | 74 | 200 | 215 | 56 | 41 | 215 | 200 |
| 41 | 56 | 164 | 216 | 92 | 40 | 216 | 164 |
| 40 | 92 | 108 | 193 | 148 | 63 | 193 | 108 |
| 63 | 148 | 217 | 217 | 39 | 39 | 128 | 128 |

Vector set 1

| | | | | | | | |
|---|---|---|---|---|---|---|---|
| 128 | 128 | 133 | 133 | 123 | 123 | 126 | 135 |
| 130 | 121 | 135 | 126 | 121 | 130 | 143 | 143 |
| 113 | 113 | 132 | 143 | 124 | 113 | 143 | 132 |
| 113 | 124 | 117 | 139 | 139 | 117 | 139 | 117 |
| 117 | 139 | 142 | 154 | 114 | 102 | 154 | 142 |
| 102 | 114 | 123 | 147 | 133 | 109 | 147 | 123 |
| 109 | 133 | 155 | 155 | 101 | 101 | 130 | 157 |
| 126 | 99 | 157 | 130 | 99 | 126 | 155 | 168 |
| 101 | 88 | 168 | 155 | 88 | 101 | 169 | 169 |
| 87 | 87 | 141 | 170 | 115 | 86 | 170 | 141 |
| 86 | 115 | 110 | 153 | 146 | 103 | 153 | 110 |
| 103 | 146 | 118 | 162 | 138 | 94 | 162 | 118 |
| 94 | 138 | 127 | 175 | 129 | 81 | 175 | 127 |
| 81 | 129 | 171 | 186 | 85 | 70 | 186 | 171 |
| 70 | 85 | 154 | 187 | 102 | 69 | 187 | 154 |
| 69 | 102 | 187 | 187 | 69 | 69 | 96 | 160 |
| 160 | 96 | 160 | 96 | 96 | 160 | 139 | 190 |
| 117 | 66 | 190 | 139 | 66 | 117 | 102 | 170 |
| 154 | 86 | 170 | 102 | 86 | 154 | 112 | 181 |
| 144 | 75 | 181 | 112 | 75 | 144 | 190 | 207 |
| 66 | 49 | 207 | 190 | 49 | 66 | 171 | 208 |
| 85 | 48 | 208 | 171 | 48 | 85 | 209 | 209 |
| 47 | 47 | 154 | 211 | 102 | 45 | 211 | 154 |
| 45 | 102 | 123 | 197 | 133 | 59 | 197 | 123 |
| 59 | 133 | 84 | 180 | 172 | 76 | 180 | 84 |
| 76 | 172 | 94 | 190 | 162 | 66 | 190 | 94 |
| 66 | 162 | 135 | 216 | 121 | 40 | 216 | 135 |
| 40 | 121 | 192 | 232 | 64 | 24 | 232 | 192 |
| 24 | 64 | 213 | 232 | 43 | 24 | 232 | 213 |
| 24 | 43 | 171 | 233 | 85 | 23 | 233 | 171 |
| 23 | 85 | 104 | 205 | 152 | 51 | 205 | 104 |
| 51 | 152 | 234 | 234 | 22 | 22 | 128 | 128 |

Vector set 2

| | | | | | | | |
|---|---|---|---|---|---|---|---|
| 128 | 128 | 134 | 134 | 122 | 122 | 126 | 136 |
| 130 | 120 | 136 | 126 | 120 | 130 | 146 | 146 |
| 110 | 110 | 133 | 146 | 123 | 110 | 146 | 133 |
| 110 | 123 | 115 | 141 | 141 | 115 | 141 | 115 |
| 115 | 141 | 145 | 158 | 111 | 98 | 158 | 145 |
| 98 | 111 | 121 | 151 | 135 | 105 | 151 | 121 |
| 105 | 135 | 160 | 160 | 96 | 96 | 131 | 162 |
| 125 | 94 | 162 | 131 | 94 | 125 | 160 | 176 |
| 96 | 80 | 176 | 160 | 80 | 96 | 177 | 177 |
| 79 | 79 | 143 | 178 | 113 | 78 | 178 | 143 |
| 78 | 113 | 107 | 158 | 149 | 98 | 158 | 107 |
| 98 | 149 | 116 | 169 | 140 | 87 | 169 | 116 |
| 87 | 140 | 127 | 184 | 129 | 72 | 184 | 127 |
| 72 | 129 | 180 | 197 | 76 | 59 | 197 | 180 |
| 59 | 76 | 159 | 198 | 97 | 58 | 198 | 159 |
| 58 | 97 | 198 | 198 | 58 | 58 | 89 | 167 |
| 167 | 89 | 167 | 89 | 89 | 167 | 141 | 202 |
| 115 | 54 | 202 | 141 | 54 | 115 | 97 | 178 |
| 159 | 78 | 178 | 97 | 78 | 159 | 109 | 191 |
| 147 | 65 | 191 | 109 | 65 | 147 | 202 | 223 |
| 54 | 33 | 223 | 202 | 33 | 54 | 179 | 223 |
| 77 | 33 | 223 | 179 | 33 | 77 | 225 | 225 |
| 31 | 31 | 159 | 227 | 97 | 29 | 227 | 159 |
| 29 | 97 | 122 | 211 | 134 | 45 | 211 | 122 |
| 45 | 134 | 76 | 190 | 180 | 66 | 190 | 76 |
| 66 | 180 | 87 | 202 | 169 | 54 | 202 | 87 |
| 54 | 169 | 136 | 233 | 120 | 23 | 233 | 136 |
| 23 | 120 | 204 | 251 | 52 | 5 | 251 | 204 |
| 5 | 52 | 230 | 251 | 26 | 5 | 251 | 230 |
| 5 | 26 | 180 | 253 | 76 | 3 | 253 | 180 |
| 3 | 76 | 99 | 220 | 157 | 36 | 220 | 99 |
| 36 | 157 | 254 | 254 | 2 | 2 | 128 | 128 |

Vector set 3

| | | | | | | | |
|---|---|---|---|---|---|---|---|
| 128 | 128 | 135 | 135 | 121 | 121 | 126 | 137 |
| 130 | 119 | 137 | 126 | 119 | 130 | 149 | 149 |
| 107 | 107 | 134 | 150 | 122 | 106 | 150 | 134 |
| 106 | 122 | 112 | 144 | 144 | 112 | 144 | 112 |
| 112 | 144 | 148 | 164 | 108 | 92 | 164 | 148 |
| 92 | 108 | 120 | 155 | 136 | 101 | 155 | 120 |
| 101 | 136 | 166 | 166 | 90 | 90 | 131 | 169 |

-continued

APPENDIX

| | | | | | | | |
|---|---|---|---|---|---|---|---|
| 125 | 87 | 169 | 131 | 87 | 125 | 166 | 185 |
| 90 | 71 | 185 | 166 | 71 | 90 | 186 | 186 |
| 70 | 70 | 146 | 188 | 110 | 68 | 188 | 146 |
| 68 | 110 | 103 | 163 | 153 | 93 | 163 | 103 |
| 93 | 153 | 114 | 176 | 142 | 80 | 176 | 114 |
| 80 | 142 | 127 | 195 | 129 | 61 | 195 | 127 |
| 61 | 129 | 190 | 210 | 66 | 46 | 210 | 190 |
| 46 | 66 | 165 | 212 | 91 | 44 | 212 | 165 |
| 44 | 91 | 212 | 212 | 44 | 44 | 82 | 174 |
| 174 | 82 | 174 | 82 | 82 | 174 | 143 | 216 |
| 113 | 40 | 216 | 143 | 40 | 113 | 91 | 187 |
| 165 | 69 | 187 | 91 | 69 | 165 | 105 | 203 |
| 151 | 53 | 203 | 105 | 53 | 151 | 216 | 240 |
| 40 | 16 | 240 | 216 | 16 | 40 | 189 | 241 |
| 67 | 15 | 241 | 189 | 15 | 67 | 243 | 243 |
| 13 | 13 | 165 | 246 | 91 | 10 | 246 | 165 |
| 10 | 91 | 120 | 226 | 136 | 30 | 226 | 120 |
| 30 | 136 | 66 | 201 | 190 | 55 | 201 | 66 |
| 55 | 190 | 79 | 216 | 177 | 40 | 216 | 79 |
| 40 | 177 | 138 | 253 | 118 | 3 | 253 | 138 |
| 3 | 118 | 219 | 255 | 37 | 1 | 255 | 219 |
| 1 | 37 | 249 | 255 | 7 | 1 | 255 | 249 |
| 1 | 7 | 190 | 255 | 66 | 1 | 255 | 190 |
| 1 | 66 | 94 | 237 | 162 | 19 | 237 | 94 |
| 19 | 162 | 255 | 255 | 1 | 1 | 128 | 128 |

Vector set 4

| | | | | | | | |
|---|---|---|---|---|---|---|---|
| 128 | 128 | 136 | 136 | 120 | 120 | 126 | 138 |
| 130 | 118 | 138 | 126 | 118 | 130 | 152 | 152 |
| 104 | 104 | 134 | 154 | 122 | 102 | 154 | 134 |
| 102 | 122 | 110 | 146 | 146 | 110 | 146 | 110 |
| 110 | 146 | 152 | 170 | 104 | 86 | 170 | 152 |
| 86 | 104 | 120 | 160 | 136 | 96 | 160 | 120 |
| 96 | 136 | 172 | 172 | 84 | 84 | 132 | 176 |
| 124 | 80 | 176 | 132 | 80 | 124 | 174 | 196 |
| 82 | 60 | 196 | 174 | 60 | 82 | 196 | 196 |
| 60 | 60 | 150 | 198 | 106 | 58 | 198 | 150 |
| 58 | 106 | 98 | 170 | 158 | 86 | 170 | 98 |
| 86 | 158 | 112 | 186 | 144 | 70 | 186 | 112 |
| 70 | 144 | 126 | 206 | 130 | 50 | 206 | 126 |
| 50 | 130 | 200 | 226 | 56 | 30 | 226 | 200 |
| 30 | 56 | 172 | 226 | 84 | 30 | 226 | 172 |
| 30 | 84 | 228 | 228 | 28 | 28 | 74 | 182 |
| 182 | 74 | 182 | 74 | 74 | 182 | 146 | 232 |
| 110 | 24 | 232 | 146 | 24 | 110 | 84 | 198 |
| 172 | 58 | 198 | 84 | 58 | 172 | 102 | 216 |
| 154 | 40 | 216 | 102 | 40 | 154 | 232 | 255 |
| 24 | 0 | 255 | 232 | 0 | 24 | 200 | 255 |
| 56 | 0 | 255 | 200 | 0 | 56 | 255 | 255 |
| 0 | 0 | 172 | 255 | 84 | 0 | 255 | 172 |
| 0 | 84 | 120 | 244 | 136 | 12 | 244 | 120 |
| 12 | 136 | 54 | 214 | 202 | 42 | 214 | 54 |
| 42 | 202 | 70 | 232 | 186 | 24 | 232 | 70 |
| 24 | 186 | 140 | 255 | 116 | 0 | 255 | 140 |
| 0 | 116 | 236 | 255 | 20 | 0 | 255 | 236 |
| 0 | 20 | 255 | 255 | 0 | 0 | 255 | 255 |
| 0 | 0 | 200 | 255 | 56 | 0 | 255 | 200 |
| 0 | 56 | 88 | 255 | 168 | 0 | 255 | 88 |
| 0 | 168 | 255 | 255 | 0 | 0 | 128 | 128 |

Vector set 5

| | | | | | | | |
|---|---|---|---|---|---|---|---|
| 128 | 128 | 138 | 138 | 118 | 118 | 124 | 142 |
| 132 | 114 | 142 | 124 | 114 | 132 | 158 | 158 |
| 98 | 98 | 136 | 158 | 120 | 98 | 158 | 136 |
| 98 | 120 | 106 | 150 | 150 | 106 | 150 | 106 |
| 106 | 150 | 156 | 180 | 100 | 76 | 180 | 156 |
| 76 | 100 | 118 | 166 | 138 | 90 | 166 | 118 |
| 90 | 138 | 182 | 182 | 74 | 74 | 132 | 186 |
| 124 | 70 | 186 | 132 | 70 | 124 | 182 | 208 |
| 74 | 48 | 208 | 182 | 48 | 74 | 210 | 210 |
| 46 | 46 | 154 | 212 | 102 | 44 | 212 | 154 |
| 44 | 102 | 92 | 178 | 164 | 78 | 178 | 92 |
| 78 | 164 | 108 | 196 | 148 | 60 | 196 | 108 |
| 60 | 148 | 126 | 222 | 130 | 34 | 222 | 126 |
| 34 | 130 | 214 | 244 | 42 | 12 | 244 | 214 |
| 12 | 42 | 180 | 246 | 76 | 10 | 246 | 180 |
| 10 | 76 | 246 | 246 | 10 | 10 | 64 | 192 |
| 192 | 64 | 192 | 64 | 64 | 192 | 150 | 252 |
| 106 | 4 | 252 | 150 | 4 | 106 | 76 | 212 |
| 180 | 44 | 212 | 76 | 44 | 180 | 96 | 234 |
| 160 | 22 | 234 | 96 | 22 | 160 | 252 | 255 |
| 4 | 0 | 255 | 252 | 0 | 4 | 214 | 255 |

| | | | | | | | |
|---|---|---|---|---|---|---|---|
| 42 | 0 | 255 | 214 | 0 | 42 | 255 | 255 |
| 0 | 0 | 180 | 255 | 76 | 0 | 255 | 180 |
| 0 | 76 | 118 | 255 | 138 | 0 | 255 | 118 |
| 0 | 138 | 40 | 232 | 216 | 24 | 232 | 40 |
| 24 | 216 | 60 | 252 | 196 | 4 | 252 | 60 |
| 4 | 196 | 142 | 255 | 114 | 0 | 255 | 142 |
| 0 | 114 | 255 | 255 | 0 | 0 | 255 | 255 |
| 0 | 0 | 255 | 255 | 0 | 0 | 255 | 255 |
| 0 | 0 | 214 | 255 | 42 | 0 | 255 | 214 |
| 0 | 42 | 80 | 255 | 176 | 0 | 255 | 80 |
| 0 | 176 | 255 | 255 | 0 | 0 | 128 | 128 |

Vector set 6

| | | | | | | | |
|---|---|---|---|---|---|---|---|
| 128 | 128 | 140 | 140 | 116 | 116 | 124 | 144 |
| 132 | 112 | 144 | 124 | 112 | 132 | 164 | 164 |
| 92 | 92 | 138 | 164 | 118 | 92 | 164 | 138 |
| 92 | 118 | 102 | 154 | 154 | 102 | 154 | 102 |
| 102 | 154 | 162 | 188 | 94 | 68 | 188 | 162 |
| 68 | 94 | 114 | 174 | 142 | 82 | 174 | 114 |
| 82 | 142 | 192 | 192 | 64 | 64 | 134 | 196 |
| 122 | 60 | 196 | 134 | 60 | 122 | 192 | 224 |
| 64 | 32 | 224 | 192 | 32 | 64 | 226 | 226 |
| 30 | 30 | 158 | 228 | 98 | 28 | 228 | 158 |
| 28 | 98 | 86 | 188 | 170 | 68 | 188 | 86 |
| 68 | 170 | 104 | 210 | 152 | 46 | 210 | 104 |
| 46 | 152 | 126 | 240 | 130 | 16 | 240 | 126 |
| 16 | 130 | 232 | 255 | 24 | 0 | 255 | 232 |
| 0 | 24 | 190 | 255 | 66 | 0 | 255 | 190 |
| 0 | 66 | 255 | 255 | 0 | 0 | 50 | 206 |
| 206 | 50 | 206 | 50 | 50 | 206 | 154 | 255 |
| 102 | 0 | 255 | 154 | 0 | 102 | 66 | 228 |
| 190 | 28 | 228 | 66 | 28 | 190 | 90 | 254 |
| 166 | 2 | 254 | 90 | 2 | 166 | 255 | 255 |
| 0 | 0 | 255 | 255 | 0 | 0 | 230 | 255 |
| 26 | 0 | 255 | 230 | 0 | 26 | 255 | 255 |
| 0 | 0 | 190 | 255 | 66 | 0 | 255 | 190 |
| 0 | 66 | 116 | 255 | 140 | 0 | 255 | 116 |
| 0 | 140 | 24 | 252 | 232 | 4 | 252 | 24 |
| 4 | 232 | 46 | 255 | 210 | 0 | 255 | 46 |
| 0 | 210 | 144 | 255 | 112 | 0 | 255 | 144 |
| 0 | 112 | 255 | 255 | 0 | 0 | 255 | 255 |
| 0 | 0 | 255 | 255 | 0 | 0 | 255 | 255 |
| 0 | 0 | 232 | 255 | 24 | 0 | 255 | 232 |
| 0 | 24 | 70 | 255 | 186 | 0 | 255 | 70 |
| 0 | 186 | 255 | 255 | 0 | 0 | 128 | 128 |

Vector set 7

| | | | | | | | |
|---|---|---|---|---|---|---|---|
| 128 | 128 | 142 | 142 | 114 | 114 | 124 | 146 |
| 132 | 110 | 146 | 124 | 110 | 132 | 170 | 170 |
| 86 | 86 | 140 | 172 | 116 | 84 | 172 | 140 |
| 84 | 116 | 96 | 160 | 160 | 96 | 160 | 96 |
| 96 | 160 | 168 | 200 | 88 | 56 | 200 | 168 |
| 56 | 88 | 112 | 182 | 144 | 74 | 182 | 112 |
| 74 | 144 | 204 | 204 | 52 | 52 | 134 | 210 |
| 122 | 46 | 210 | 134 | 46 | 122 | 204 | 242 |
| 52 | 14 | 242 | 204 | 14 | 52 | 244 | 244 |
| 12 | 12 | 164 | 248 | 92 | 8 | 248 | 164 |
| 8 | 92 | 78 | 198 | 178 | 58 | 198 | 78 |
| 58 | 178 | 100 | 224 | 156 | 32 | 224 | 100 |
| 32 | 156 | 126 | 255 | 130 | 0 | 255 | 126 |
| 0 | 130 | 252 | 255 | 4 | 0 | 255 | 252 |
| 0 | 4 | 202 | 255 | 54 | 0 | 255 | 202 |
| 0 | 54 | 255 | 255 | 0 | 0 | 36 | 220 |
| 220 | 36 | 220 | 36 | 36 | 220 | 158 | 255 |
| 98 | 0 | 255 | 158 | 0 | 98 | 54 | 246 |
| 202 | 10 | 246 | 54 | 10 | 202 | 82 | 255 |
| 174 | 0 | 255 | 82 | 0 | 174 | 255 | 255 |
| 0 | 0 | 255 | 255 | 0 | 0 | 250 | 255 |
| 6 | 0 | 255 | 250 | 0 | 6 | 255 | 255 |
| 0 | 0 | 202 | 255 | 54 | 0 | 255 | 202 |
| 0 | 54 | 112 | 255 | 144 | 0 | 255 | 112 |
| 0 | 144 | 4 | 255 | 252 | 0 | 255 | 4 |
| 0 | 252 | 30 | 255 | 226 | 0 | 255 | 30 |
| 0 | 226 | 148 | 255 | 108 | 0 | 255 | 148 |
| 0 | 108 | 255 | 255 | 0 | 0 | 255 | 255 |
| 0 | 0 | 255 | 255 | 0 | 0 | 255 | 255 |
| 0 | 0 | 252 | 255 | 4 | 0 | 255 | 252 |
| 0 | 4 | 60 | 255 | 196 | 0 | 255 | 60 |
| 0 | 196 | 255 | 255 | 0 | 0 | 128 | 128 |

What is claimed is:

1. A computer implemented method for scalably encoding in real time a sequence of digital video frames, comprising the steps of:
    (A) selecting a target digital processor class to be used for decoding said sequence;
    (B) selecting a stillperiod value in accordance with the selected target digital processor class; and
    (C) encoding every Nth frame of said sequence as a still frame and encoding all other frames using interframe difference values, wherein N is equal to said stillperiod value.

2. An apparatus for scalably encoding in real time a sequence of digital video frames, comprising:
    (A) means for selecting a target digital processor class to be used for decoding said sequence;
    (B) means for selecting a stillperiod value in accordance with the selected target digital processor class; and
    (C) means for encoding every Nth frame of said sequence as a still frame and encoding all other frames using interframe difference values, wherein N is equal to said stillperiod value.

* * * * *